US008214065B2

(12) United States Patent
Aoki et al.

(10) Patent No.: US 8,214,065 B2
(45) Date of Patent: Jul. 3, 2012

(54) AUDIO SIGNAL PROCESSING DEVICE

(75) Inventors: Takamitsu Aoki, Hamamatsu (JP); Masaru Aiso, Hamamatsu (JP); Takashi Suzuki, Hamamatsu (JP); Kotaro Terada, Hamamatsu (JP); Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1161 days.

(21) Appl. No.: 12/039,943

(22) Filed: Feb. 29, 2008

(65) Prior Publication Data

US 2008/0215791 A1 Sep. 4, 2008

(30) Foreign Application Priority Data

Mar. 1, 2007 (JP) ................................ 2007-051169

(51) Int. Cl.

| | |
|---|---|
| ***G06F 17/00*** | (2006.01) |
| ***G06F 3/00*** | (2006.01) |
| ***G06F 3/16*** | (2006.01) |
| ***H04B 1/00*** | (2006.01) |

(52) U.S. Cl. ........... 700/94; 381/119; 715/716; 715/727

(58) Field of Classification Search .................... 700/94; 381/119; 715/716, 727
See application file for complete search history.

(56) References Cited

U.S. PATENT DOCUMENTS

| | | | | |
|---|---|---|---|---|
| 5,930,375 | A * | 7/1999 | East et al. | 381/119 |
| 7,139,624 | B2 * | 11/2006 | Terada et al. | 700/94 |
| 2006/0210098 | A1 * | 9/2006 | Okabayashi et al. | 381/119 |

OTHER PUBLICATIONS

PM5D Digital Mixing Console PM5D/PM5D-RH Owner's Manual, Yamaha Corporation, 2004.

* cited by examiner

*Primary Examiner* — Jesse Elbin
(74) *Attorney, Agent, or Firm* — Morrison & Foerster LLP

(57) ABSTRACT

In a digital mixer, a standard mode or a switched mode of an input patch is selectable. When shifting from the standard mode to the switched mode is selected, input port information in input patch data stored in a current memory is converted according to a port correspondence relation indicated by conversion data. When shifting from the switched mode to the standard mode is selected, the input port information in the input patch data stored in the current memory is reversely converted to original information according to the port correspondence relation indicated by the conversion data.

9 Claims, 12 Drawing Sheets

AUDIO SIGNAL PROCESSING DEVICE

BACKGROUND OF THE INVENTION

1. Field of the Invention

The invention relates to an audio signal processing device processing audio signals inputted from plural input ports, in plural input channels, and a machine-readable medium containing program instructions executable by a computer and causing the computer to control such an audio signal processing device.

2. Description of the Related Art

Conventionally, a digital mixer described in, for example, the Document 1 is known as an audio signal processing device that processes audio signals inputted from plural input ports, in plural input channels.

Such a device is used, for example, for the following use. That is, some microphones and the like is respectively connected to input terminals, each of which corresponds to an input port, characteristics of audio signals inputted from the microphones are adjusted in input channels, and the characteristic-adjusted signals are outputted to a speaker and the like to generate sounds according to the signals.

Further, another use is also known. That is, audio signals inputted to the digital mixer during real performance are outputted and recorded to a recorder without adjusting characteristics, and the operator adjusts the settings of the digital mixer while listening to the result of the same signal processing as that during the real performance, using the audio signals recorded in the recorder as a copy of inputs during the real performance.

Document 1: "PM5D/PM5D-RH Operation Manual," YAMAHA Corporation, 2004

SUMMARY OF THE INVENTION

As described above, when settings are adjusted using the recorded audio signals, the content of the signal processing is the same as that during the real performance, but the input source of the audio signals are different. The input source during the real performance is, for example, a microphone placed on the stage, and the input source during the adjustment is a recorder. Those external devices are to be connected to different input terminals of the digital mixer unless certain lines are reconnected. The signals are thus inputted to the digital mixer via different input ports.

On the other hand, in the digital mixer, plural input patch files indicating correspondence relations of input ports and input channels are created and stored by a user. When a desired input patch file is read and set, audio signals are input to and processed in each input channel according to the correspondence relation of the input patch file.

By selecting a proper input patch file and setting it, signals from a desired input source can be inputted to the input channels in both cases of real performance and adjustment, if input patch files used during real performance and input patch files used during adjustment are provided, the input patch files for real performance indicating correspondence relations to input signals from the microphone to the input channels and the input patch file for adjustment indicating correspondence relations to input signals from the recorder to the input channels.

However, a number of input patch files are often required for every play or every scene in a play. In such a case, if files for real performance and files for adjustment are prepared in every condition, a great number of files are needed. Thus, there have been problems such that it takes time to find a proper file when setting files and that an undesired input patch file can be set by a wrong operation.

These problems also occur in other audio signal processing devices in addition to digital mixers.

The invention has an object to solve the above problems and provide an audio signal processing device which processes audio signals inputted from plural input ports, in plural input channels, wherein settings corresponding to the situations can be easily and precisely provided even when audio signals are inputted from different input ports according to the situations and those inputted signals are to be provided for the same signal processing.

To attain the object, the present invention provides an audio signal processing device which processes audio signals inputted from plural input ports, in plural input channels, including: a first memory that stores input patch data indicating correspondence relations between each of the input ports and the input channel which processes the audio signal inputted from the input port; a second memory that stores conversion data indicating a rule for converting input port information included in the input patch data; a patch setting device that reads the input patch data from the first memory and sets the data to a state to be reflected in the audio signal processing; an accepting device that accepts an instruction for shifting an input patch from a standard mode to a switched mode; and a patch switching device that converts the input port information included in the input patch data to be reflected in the audio signal processing into post-conversion information according to the conversion data when the acceptor accepts the instruction for shifting.

In such an audio signal processing device, it is preferable that a second accepting device that accepts an instruction for shifting the input patch from the switched mode to the standard mode, and a second patch switching device that reversely converts the input port information in the input patch data to be reflected in the audio signal processing from the post-conversion information to pre-conversion information according to the conversion data when the second acceptor accepts the instruction for shifting are further provided.

It is also preferable that the patch setting device includes a device that converts the input port information in the read input patch data according to the conversion data to have the post-conversion information being reflected in the audio signal processing if the input patch is in the switched mode when setting the input patch data read from the first memory to the state to be reflected in the audio signal processing.

It is also preferable that a scene memory that stores scene data including a set of parameter values to be reflected in the audio signal processing executed by the audio signal processing device and/or specification data that specifies a source of the parameter values, and a scene setting device that sets a proper set of parameter values to a state to be reflected in the audio signal processing according to the scene data read from the scene memory are further provided, and the scene setting device includes a device that converts the input port information in the input patch data among the parameter values to be reflected in the audio signal processing according to the conversion data to have the post-conversion information being reflected in the audio signal processing, if the input patch is in the switched mode when setting the set of parameter values to the state to be reflected in the audio signal processing.

It is also preferable that a storing device that stores all or a part of the parameter values to be reflected in the audio signal processing is further provided, and the storing device includes a device that converts the input port information in the input patch data to be stored, from the post-conversion information into the pre-conversion information according to the conversion data, and stores the pre-conversion information, if the input patch is in the switched mode when the input patch data to be reflected in the audio signal processing is stored.

It is also preferable that the second memory has a capacity to store plural pieces of the conversion data, a selector that selects conversion data to be used for converting the input patch data is provided, and the patch switching device includes a device that reversely converts the input port information in the input patch data to be reflected in the audio signal processing from the post-conversion information to the pre-conversion information according to currently used conversion data, and further converts the pre-conversion information to another post-conversion information according to the newly selected conversion data, if the input patch is in the switched mode when the selector selects new conversion data.

The invention also provides a machine-readable medium containing program instructions executable by a computer that controls an audio signal processing device which processes audio signals inputted from plural input ports, in plural input channels, wherein the program instructions causing the computer to execute: a first storing step of storing, to a first memory, input patch data indicating correspondence relations between each of the input ports and the input channel which processes the audio signal inputted from the input port; a second storing step of storing, to a second memory, conversion data indicating a rule for converting input port information included in the input patch data; a patch setting step of reading the input patch data from the first memory and setting the data to a state to be reflected in the audio signal processing; an accepting step of accepting an instruction for shifting an input patch from a standard mode to a switched mode; and a patch switching step of converting the input port information included in the input patch data to be reflected in the audio signal processing into post-conversion information according to the conversion data when the instruction for shifting is accepted in the accepting step.

The above and other objects, features and advantages of the invention will be apparent from the following detailed description which is to be read in conjunction with the accompanying drawings.

DETAILED DESCRIPTION OF THE PREFERRED EMBODIMENTS

A preferred embodiment of the invention will be described in detail with reference to the drawings.

A configuration of a digital mixer as an embodiment of an audio signal processing device of the invention is firstly explained.

Figure 1:
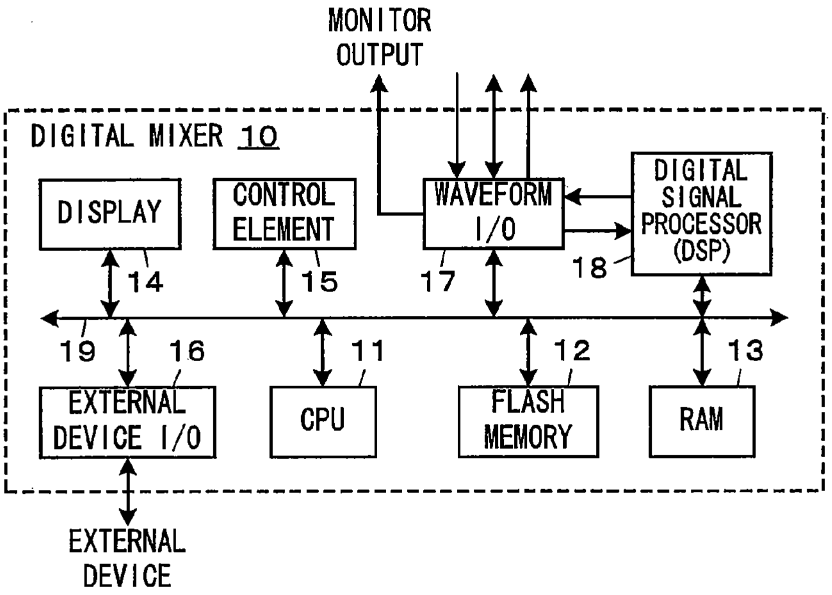
FIG. 1 is a block diagram showing a configuration of a digital mixer as an embodiment of an audio signal processing device of the invention.

FIG. 1 is a block diagram showing the configuration of the digital mixer.

As shown in FIG. 1, the digital mixer 10 has a CPU 11, a flash memory 12, a RAM 13, a display 14, a control element 15, an external device input/output module (I/O) 16, a waveform I/O 17, a digital signal processor (DSP) 18, and these components are connected to each other via a system bus 19. The digital mixer 10 also has a function for executing various signal processings to audio signals inputted from plural input ports, in signal processing elements such as plural input channels, and outputting the processed signals.

The CPU 11 is a controller which comprehensively controls operations of the digital mixer 10. The CPU 11 executes a required control program stored in the flash memory 12 to, for example, control communications via the external device I/O 16 and the waveform I/O 17, or displays on the display 14. Further, the CPU 11 detects operations of the control element 15 to set or modify parameter values or to control operations of each section according to the detected operations.

The flash memory 12 is a rewritable nonvolatile memory for storing control programs executed by the CPU 11.

The RAM 13 is a memory for storing temporarily-stored data and being used as a work memory of the CPU 11.

The display 14 is a display showing various types of information such as GUIs (graphical user interface) and parameter values according to the control of the CPU 11. The display 14 can be composed of liquid crystal display (LCD) or light-emitting diodes (LED), for example. The display 14 and control element 15 can be made combined with each other by placing the LED behind the control element or providing a touch panel on the LCD.

The control element 15 is an element to accept operations to the digital mixer 10 and composed of various keys, buttons, dials, sliders and the like. Further, as the control element 15, a touch panel can be provided on an LCD serving as a display 14. Alternatively, a driver can be provided to the control element so that the control element moves to a desired position in response to controls of the CPU 11.

The external device I/O 16 is an interface for connecting with various external devices to input and output data. The external device I/O 16 is, for example, an interface for connecting with an external display, a mouse, a keyboard for inputting letters, an operation panel and the like. Parameter settings or modifications and operation instructions can be executed in use of such external devices even when the display and control element of the digital mixer have simple configurations.

Further, a USB (Universal Serial Bus) type interface or an interface for performing Ethernet (registered trademark) communications and the like can be employed as an interface to communicate with a control device such as a personal computer (PC).

The waveform I/O 17 is an interface for accepting audio signals to be processed in the DSP 18 and outputting the processed audio signals. In the waveform I/O 17, analog input terminals respectively having A/D conversion circuits, analog output terminals respectively having D/A conversion circuits, digital input terminals for inputting digital data and digital output terminals for outputting digital data are provided in an arbitrary combination. The terminals can be added using an extension board. Further, the waveform I/O 17 also includes a monitor output terminal, which is used by an operator of the digital mixer 10 to monitor signals being processed in the DSP 18.

The DSP 18 is a signal processor which includes a signal processing circuit and performs various signal processings such as mixing and equalizing on audio signals inputted from the waveform I/O 17 according to the various parameter values stored in a current memory and outputs the processed signals to the waveform I/O 17. A storage area of the current memory can be provided in memories disposed in the RAM 13 or DSP 18 itself.

Figure 2:
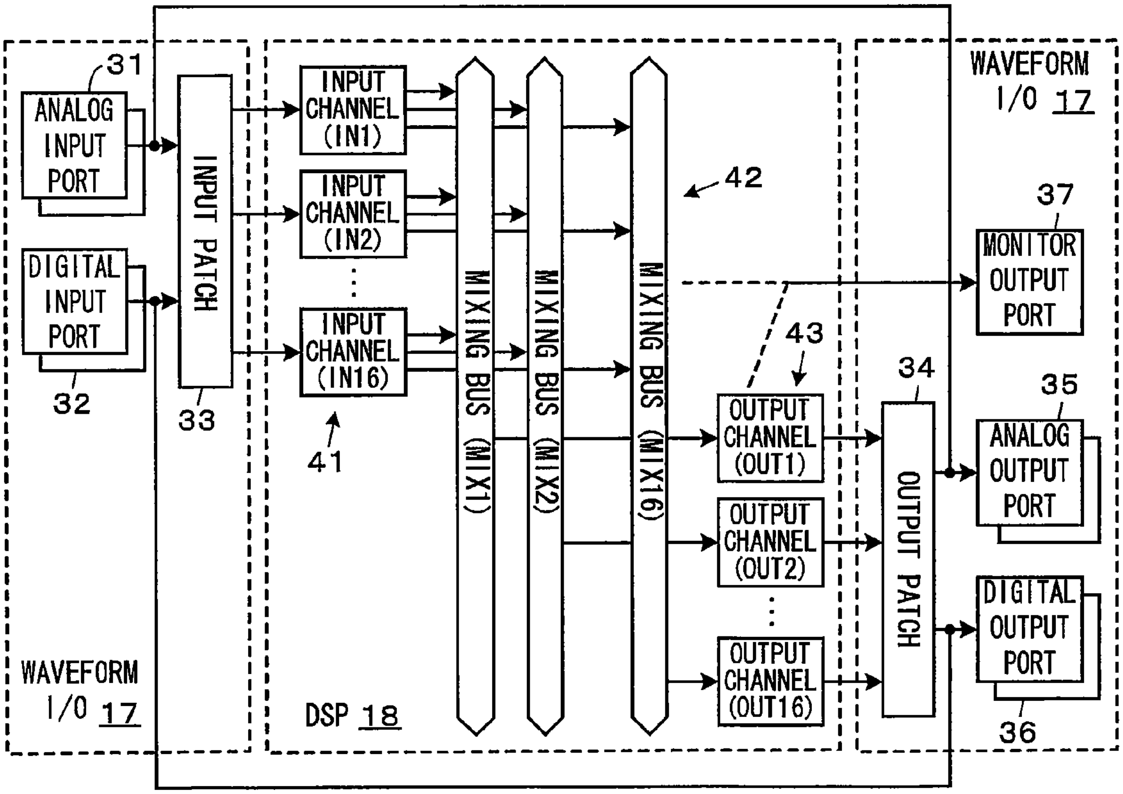
FIG. 2 is a diagram showing detailed configurations of a waveform I/O and a DSP shown in FIG. 1.

FIG. 2 shows more detailed configurations of the waveform I/O 17 and DSP 18 of FIG. 1.

As shown in FIG. 2, the waveform I/O 17 includes analog input ports 31, digital input ports 32, an input patch 33, an output patch 34, analog output ports 35, digital output ports 36 and a monitor output port 37. The DSP 18 includes input channels 41, MIX (mixing) busses 42 and output channels 43.

Among these elements, the respective ports of the waveform I/O 17 are disposed corresponding to the input and output terminals (not shown).

The waveform I/O 17 receives analog audio signals inputted via a cable connected to the analog input terminal after being converted into digital audio signals (waveform data) by the analog input port 31 corresponded to the terminal. Similarly, the waveform I/O 17 receives audio signals inputted via a cable connected to the digital input terminal by the digital input port 32 corresponded to the terminal.

The input patch 33 supplies the waveform data received by the respective input ports 31, 32 to the input channels 41 corresponded to the input ports according to the correspondence relation specified by later-described input patch data so that signal processings are executed in the input channels 41. To set signal supply paths from the input ports to the input channels in this way is referred to as "to patch (connect)" the ports with the channels. Here, a single input port can be patched with plural input channels 41; however, plural input ports cannot be patched with a single input channel.

In the DSP 18, signal processing elements, such as a limiter, a compressor, an equalizer, a fader and a pan, process the signals, which are inputted from the patched port, in the sixteen input channels 41. Then, the processed signals are sent to each of the MIX buses 42 of the sixteen systems after the send levels thereof being adjusted. In each of the input channels 41, output ON/OFF to each system of the MIX buses 42 (output ON/OFF) can be individually set.

In each system of the MIX buses 42, the signals inputted from respective input channels 41 are mixed and outputted to the sixteen output channels 43 corresponded to the respective systems. In each of the output channels 43, signal processing elements, such as a limiter, a compressor, an equalizer and a fader process the signals inputted from the corresponded busses and output the processed signals to the analog output port 35 and/or digital output port 36 with which the output channel is patched by the output patch 34.

The output patch 34 patches each of the output channels 43 with the output ports according to the correspondence relation specified by the later-described output patch data. The output patch 34 can patch a single output channel 43 with plural output ports but cannot patch plural output channels 43 with a single output port.

The waveform I/O 17 outputs the digital audio signals supplied to the analog output port 35 after D/A converting the signals into analog audio signals, to a cable connected to the analog output terminal corresponded to the port. Similarly, the waveform I/O 17 outputs the digital audio signals supplied to the digital output port 36 to a cable connected to the digital output terminal corresponded to the port. The outputted audio signals are used based on the purpose of connected devices. For example, the signals are used for a sound generation if the connected device is a speaker, or to record if the connected device is a recorder.

The monitor output port 37 is a port corresponding to the monitor output terminal for operators, and outputs signals of an arbitrarily selected system of the MIX bus 42 or output channel 43.

The waveform I/O 17 also has a path used for a direct-out output to supply audio signals received by the input ports 31, 32 directly to the corresponded output ports 35, 36 without forwarding to the patch or DSP 18. This path is used for outputting the inputted audio signals to the recorder to record the signals without any processing, for example.

The functions of each section shown in FIG. 2 can be realized as either software or hardware.

One of the characteristics of the digital mixer 10 having the above described functions is that the input patch data specifying patch contents of input patch can be easily changed according to a predetermined correspondence relation, from one content to another.

This characteristic will be described. In the following description, it is not considered whether the ports used for inputting and outputting audio signals are analog ports or digital ports, since it does not cause essential differences.

Figure 3:
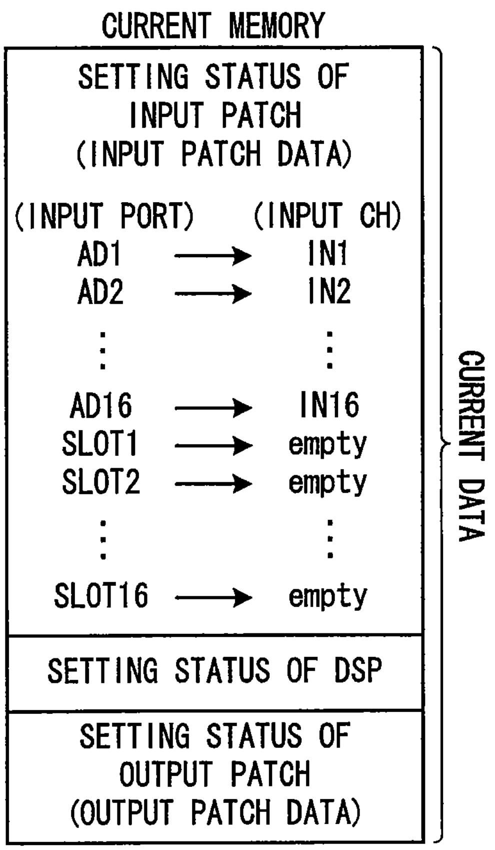
FIG. 3 is a diagram showing a configuration of data stored in a current memory of the digital mixer shown in FIG. 1.

FIG. 3 shows the configuration of data stored in the current memory of the digital mixer 10.

The current memory is a memory which stores parameter values reflected to audio signal processing executed by the digital mixer 10. As shown in FIG. 3, the data stored in the current memory includes input patch data indicating a setting status of the input patch 33, data indicating a setting status of the DSP 18, and output patch data indicating a setting status of the output patch 34. A set of all these pieces of data is referred to as current data.

The parameter values stored in the current memory are the values currently set to the DSP 18, input patch 33 and output patch 34, and once the parameter values in the current memory are modified, the modification is immediately reflected to audio signal processings in the DSP 18, input patch 33 and output patch 34.

Among the current data, the input patch data is data indicating a correspondence relation between the input ports 31, 32 and the input channels (ch) 41 in the input patch 33, and specifies which input channel is to be connected to the port for all input ports in the digital mixer 10. In this embodiment, it is assumed that the digital mixer 10 has thirty two input ports to be patched, including sixteen input ports AD1 to AD16 corresponded to the input terminals on the main body and sixteen input ports SLOT1 to SLOT16 corresponded to the input terminals on the extension board.

Since it is not possible to supply signals from plural ports to a single input channel as described above, it is allowed that some input ports have no corresponding input channel. In this case, "empty" is written as a corresponding input channel of the input port. Further, the input patch data does not have to include all input channels. It is allowed that some input channels have no corresponding input ports. Needless to say, it is also accepted that the ports and channels are written with their identifiers other than the forms shown in FIG. 3.

The digital mixer 10 is characterized by the way of handling such input patch data, but the data format itself can be conventional one.

The data indicating a setting status of the DSP 18 is mainly a set of parameter values specifying contents of signal processing which is executed by all signal processing elements constituting all the channels and buses of the DSP 18. The content of the signal processing in the DSP 18 can be set by setting a desired parameter value to the current memory.

The output patch data is data indicating the correspondence relations between the output channels 43 and the output ports 35, 36 in the output patch 34, and specifies which output port is to be patched with each channel for all output channels of the digital mixer 10.

Content examples of those data indicating the setting status of the DSP 18 and output patch data are not shown in the drawings, but conventional content and data formats can be employed.

Figure 4:
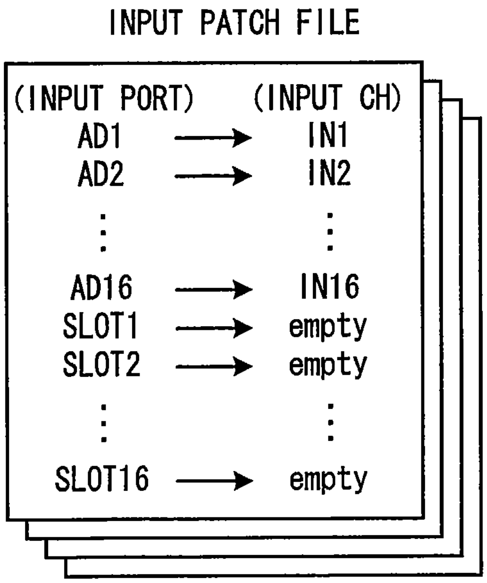
FIG. 4 is a diagram showing an example of an input patch file to be stored in the digital mixer.

FIG. 4 shows an example of an input patch file.

The input patch data shown in FIG. 3 can be individually extracted from the current data and stored, in a from of an input patch file shown in FIG. 4, in a nonvolatile memory such as the flash memory 12. When the input patch file is read and stored in the current memory as input patch data, only the input patch data in the current data is replaced with previously stored data and the data content can be reflected to the operation of the input patch 33.

A memory storing such input patch files is a first memory. The first memory has a capacity to store plural input patch files, and a user can select a desired input patch file among the plural files to store in the current memory.

When storing the input patch data in the current memory as an input patch file, the file can be written over an existent file or stored as a new file with a new name.

The output patch data can also be stored as an output patch files, and these files can be read and stored in the current memory to reflect the content to the operation of the output patch 34.

Figure 5:
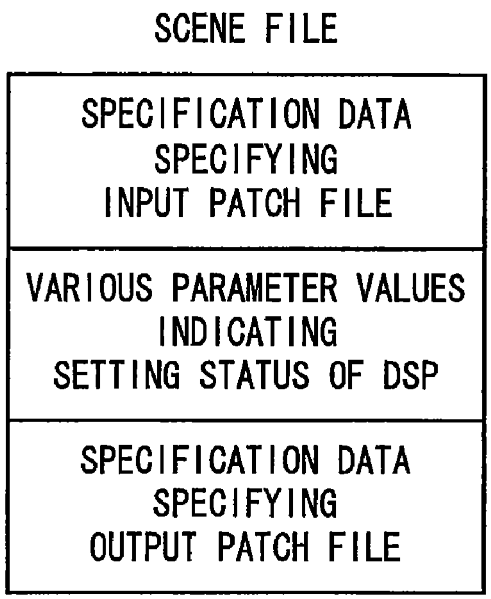
FIG. 5 is a diagram showing a configuration of a scene file to be stored in the digital mixer.

FIG. 5 shows a configuration of a scene file.

The current data shown in FIG. 3 can be stored as a whole in a nonvolatile memory such as the flash memory 12 in form of a scene file shown in FIG. 5. By reading the scene file out of the memory and storing the content into the current memory as current data, the entire current data can be changed to a previously stored content and the content can be made in a state to be reflected to audio signal processings. The memory for storing the scene files is a scene memory, and the current data stored in a form of scene file is referred to as scene data in order to distinguish from the parameter values reflected to processings.

The content of the entire current data can be written in the scene file as it is. However, in this embodiment, only the various parameter values indicating the setting status of the DSP are written in the file, the input patch data and the output patch data are stored as the above described input patch file and output patch file, and specification data specifying these files is written in the scene file.

Thus, when the scene file shown in FIG. 5 is read, the input patch data to be stored into the current memory is obtained by reading out the input patch file specified by the specification data. It is the same in the case of the output patch data.

When storing the content of the current memory, the name of the scene file can be arbitrarily set. Concerning names of patch files for storing the input patch data and output patch data, it is acceptable that the names can be also arbitrarily set, but it is also acceptable that the names are automatically generated.

The scene file can be written over an existent file or stored as a newly created file. However, concerning the patch files, when the patch files are written over existent files, there is a possibility that the content of a patch file, which is being referred by another scene file, is modified unexpectedly. When storing the scene file, it is thus preferable that the patch files are stored as newly created files.

In the digital mixer 10, the input patch 33 is configured to operate in two modes: a standard mode and a switched mode.

The standard mode is a mode to perform a patch process according to the input patch data stored in the input patch file, and the switched mode is a mode to perform a patch process according to input patch data obtained by converting the input patch data recorded in the input patch file using a predetermined rule.

Concretely, such modes can be switched by converting the input patch data in the current data according to a mode switch instruction.

Figure 6:
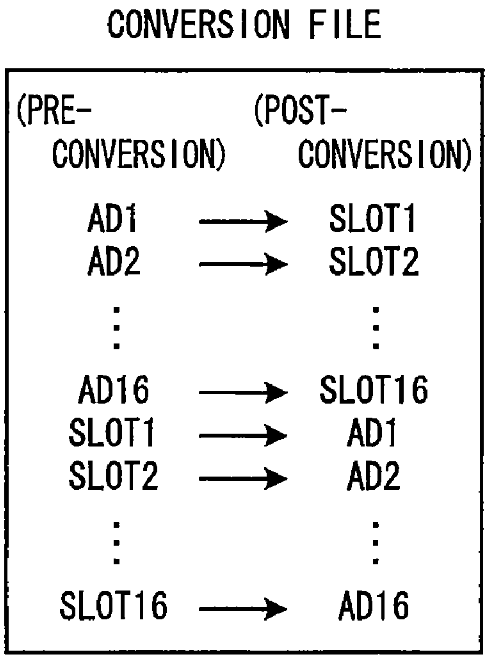
FIG. 6 is a diagram showing an example of a conversion file to be stored in the digital mixer.

FIG. 6 shows an example of a conversion file including conversion data, which indicates the rules for conversion.

The rules indicated by the conversion data of the conversion file shown in FIG. 6 are used to convert information of each input port included in the input patch data into information of another input port of the digital mixer 10. The conversion rules are created so that a pre-conversion port and a post-conversion port are associated with each other in form of one-to-one relation for realizing conversion from the pre-conversion information into the post-conversion information but also the reverse conversion from the post-conversion information into pre-conversion information.

Here, there can be some ports, which are not changed by the conversion. Preferably, correspondence relations of all ports are written in the conversion file for easier recognition of the correspondence relations although it is not required to write information of ports, which are not changed by the conversion, in the conversion file if the one-to-one relation is maintained.

This conversion file is created by a user and stored in a nonvolatile memory such as the flash memory 12. The memory for storing this file is a second memory.

Figure 7:
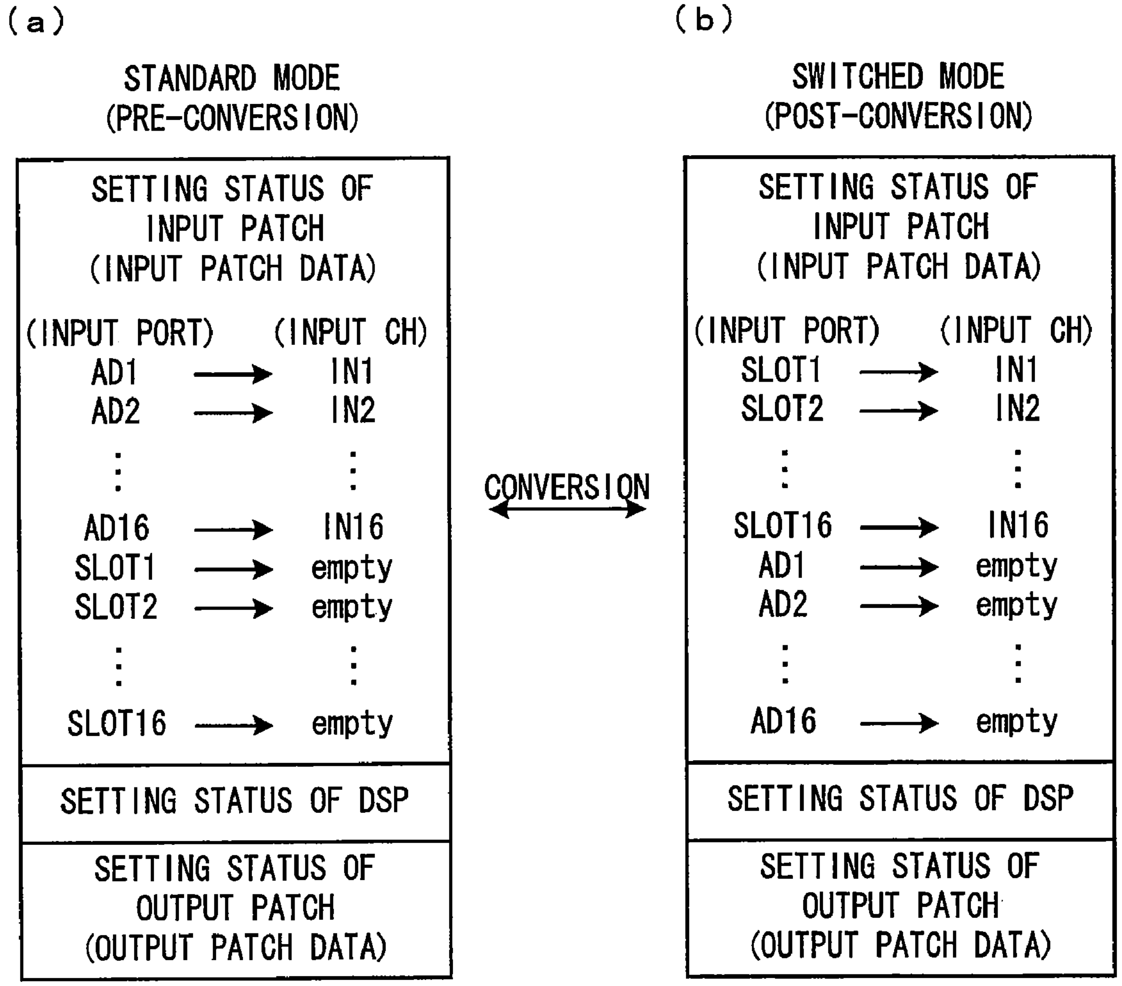
FIG. 7 is a diagram showing an example of conversion of an input patch data according to the conversion file.

FIG. 7 shows an example of an input patch data conversion according to the conversion file.

In FIG. 7, (a) shows a pre-conversion state, that is a state of the current memory shown in FIG. 3. When it is instructed to shift to a switched mode in this state, the CPU 11 converts information of each input port in the input patch data stored in the current memory from pre-conversion information into post-conversion information according to the conversion rule described in the conversion file shown in FIG. 6. As a result, the content of the current memory is changed to the post-conversion information shown by (b). In the digital mixer 10, since signal processings are always executed according to the content of the current memory, patch processes in the input patch 33 are executed according to the content of the current memory shown by (b) in a switched mode.

When it is instructed to shift from a switched mode to a standard mode, the CPU 11 changes the information of each input port in the input patch data stored in the current memory by converting the post-conversion information into the pre-conversion information according to the conversion rules described in the conversion file. As a result, the content of the current memory is switched back to the pre-conversion state shown by (a). The patch processes in the input patch 33 are thus executed in the original state.

In these conversions, the data of the input ports are shown in different orders in the drawings between the pre-conversion information and the post-conversion information. However, the main point is that the correspondence relations between the input ports and input channels indicated by the input patch data is changed by the conversion, and the order of the data of the input ports is not important. Thus, the order of the input ports in the input patch data of the post-conversion state shown by (b) can be the same as in (a).

Further, since it is not recognized whether the input patch is presently in a standard mode or a switched mode based on the input patch data itself, the mode information is stored separately from the input patch data. Alternatively, data indicating current mode can be added to the input patch data.

Such mode shifting is effective in a case, in which the digital mixer 10 is used in both real performance recordings and adjustments, that is, when the DSP 18 executes same signal processing on input signals as switching the input source of the signals. It is particularly effective when the input ports to which signals are inputted before the switching and input ports to which signals are inputted after the switching correspond to each other in form of one-to-one relation.

For example, the digital mixer 10 is often used to output signals inputted from plural microphones into input ports during a real performance directly to a recorder in order to separately record the signals of each port in different tracks, and the recorded signals are reproduced and used as an artificial performance input during adjustments. In this case, the signals inputted from each track of the recorder to the digital mixer 10 during the adjustments correspond to the signals inputted from each microphone during the performance.

Then, for example, using the settings shown in FIGS. 7A and 7B, the digital mixer 10 is operated in a standard mode and signals from the microphones are inputted to the input ports AD1 to AD16 and supplied to the input channels IN1 to IN16 to process, during the performance. Here, when it is shifted to a switched mode during the adjustments and the signals from the recorder (signals inputted to the input ports AD1 to AD16 and recorded during a real performance) are inputted to the input ports SLOT1 to SLOT16 which are not used for input in the standard mode, the signals can be supplied to the same input channels IN1 to IN16 to be processed as in the case of the standard mode. Then, when the correspondence relations between the ports to which signals are inputted in a standard mode and the port to which corresponding signals are inputted in a switched mode are made one-to-one relation which is consistent with the content of the conversion data, corresponding signals can be supplied to the same input channels 41 to be processed both in the standard mode and switched mode.

The switching of input patches can be executed simply by switching the modes, and this allows easier and more accurate operations for selecting any input patch data. Further, since it is not required to prepare input patch data for adjustment for every input patch data even when plural pieces of input patch data are used during a real performance, operation load can be reduced. Further, by providing a mode-selection control on an operation panel, the mode switching operation can be done by a single touch and this allows a further easier operation.

Processes executed by the CPU 11 for performing the mode switching will be described.

Starts of the following processes are triggered by an instruction received in the CPU 11. The CPU 11 serves as an accepting device and accepts instructions via control elements on the operation panel or a GUI shown on the display, or accepts the instructions as a command which is automatically generated or sent from an external device.

Figure 8:
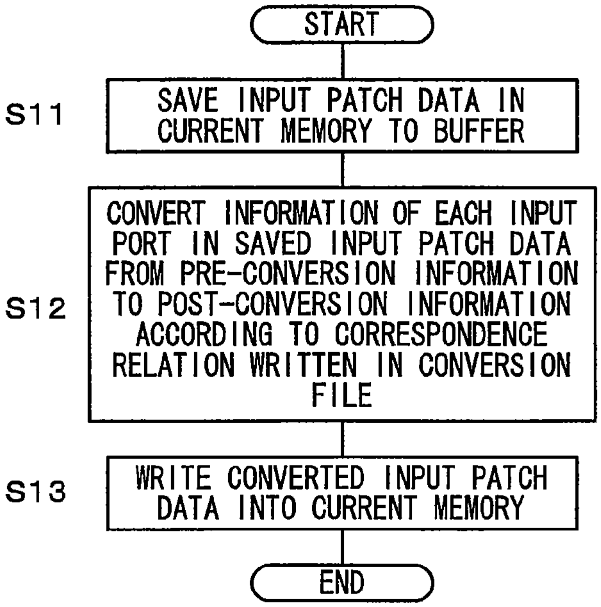
FIG. 8 is a flowchart showing a process executed by a CPU of the digital mixer shown in FIG. 1 when an instruction for shifting from a standard mode to a switched mode is received.

FIG. 8 is a flowchart of a process executed when an instruction for shifting from the standard mode to the switched mode is received.

When receiving an instruction for shifting from the standard mode to the switched mode, the CPU 11 starts the process of the flowchart in FIG. 8. Then, the CPU 11 saves the input patch data in the current memory to a buffer (S11), and converts the information of each input port in the saved input patch data from the pre-conversion information to the post-conversion information according to the correspondence relation written in the conversion file (S12).

This conversion is performed presuming that the input port data stored in the current memory when the shifting to the switched mode is instructed and then saved to the buffer is the pre-conversion input port information, and the CPU 11 performs the conversion such that the CPU 11 reads the post-conversion input port information corresponding to the pre-conversion input port out of the conversion file, and writes the read information over the pre-conversion input port information in the buffer.

Then, the CPU 11 writes the post-conversion input patch data stored in the buffer into the current memory to reflect the change in the buffer to the current memory (S13) and finishes the process.

With this process, the digital mixer 10 can be shifted from the standard mode to the switched mode. In this process, the CPU 11 serves as a patch switching device.

It is preferable to stop signal processing in the digital mixer 10 or to mute its outputs while writing data to the current memory. This is because some undesired process may be executed according to the state of the current memory which is being written, as is the same with the following processes.

Figure 9:
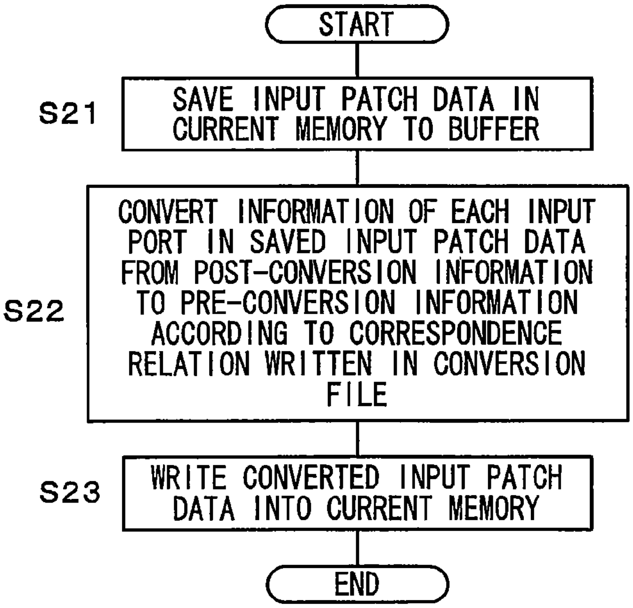
FIG. 9 is a flowchart showing a process executed by the same CPU when an instruction for shifting from the switched mode to the standard mode is received.

FIG. 9 is a flowchart of a process executed when an instruction for shifting from the switched mode to the standard mode is received.

When receiving an instruction for shifting from the switched mode to the standard mode, the CPU 11 starts the process of the flowchart in FIG. 9. This process is the same as the process shown in FIG. 8 (i.e., step S21 is the same as step S11 in FIG. 8 and step S23 is the same as step S13 in FIG. 8), except that the conversion in step S22 is that from the post-conversion information to the pre-conversion information, which is a reverse conversion of that performed in step S12 of FIG. 8.

In other words, the conversion here is performed presuming that the input port data stored in the current memory when the shifting to the standard mode is instructed and then saved to the buffer is the post-conversion input port information converted according to the conversion file, and the CPU 11 performs the conversion such that the CPU 11 reads the pre-conversion input port information corresponding to the post-conversion input port out of the conversion file, and writes the read information over the post-conversion input port information in the buffer. Then, the CPU 11 writes the pre-conversion input patch data stored in the buffer to the current memory to reflect the change in the buffer to the current memory.

With this process, the digital mixer 10 can be shifted from the switched mode to the standard mode. In this process, the CPU 11 serves as a second patch switching device.

Figure 10:
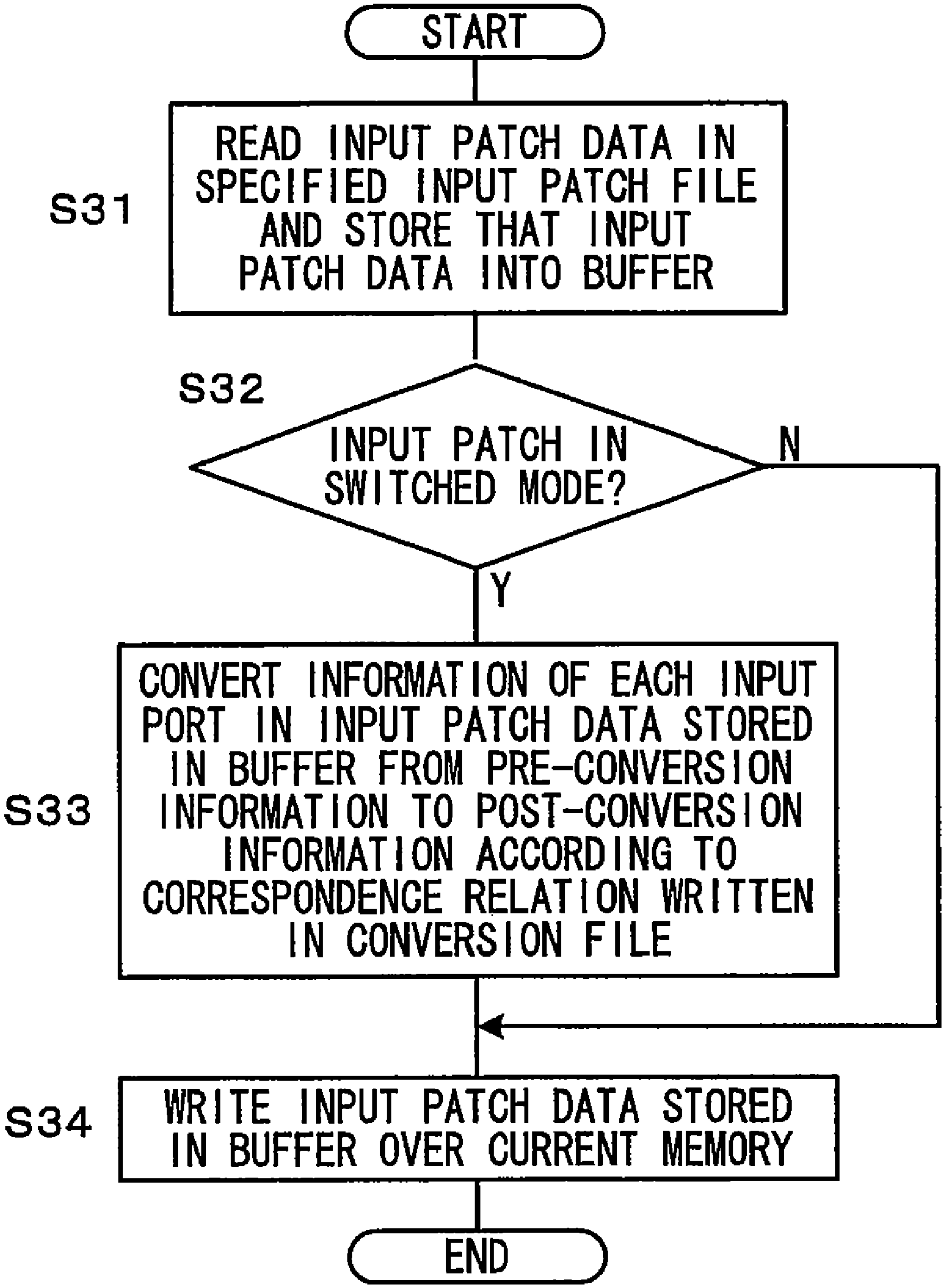
FIG. 10 is a flowchart showing a process executed by the same CPU when an instruction for loading an input patch file is received.

FIG. 10 is a flowchart of a process executed when an instruction for loading an input patch file is received.

To accept an instruction for loading an input patch file, the CPU 11 leads a user to specify a file to be loaded before accepting the loading instruction. A list of input patch files can be shown to the user so that the user can specify a file to be loaded.

When receiving the loading instruction, the CPU 11 starts the process shown in the flowchart of FIG. 10. The CPU 11 firstly reads the input patch data stored in the specified input patch file and stores the data into the buffer (S31). Then, if the input patch is in the switched mode (S32), the CPU 11 converts information of each input port in the input patch data stored in the buffer from pre-conversion information to post-conversion information according to the correspondence relation written in the conversion file (S33). This conversion process is the same as the step S12 of FIG. 8.

Then, the CPU 11 writes the post-conversion input patch data stored in the buffer over the current memory (S34) so that the data can be reflected to the patch operation of the input patch 33, and finishes the process.

When the result in the step S32 is "NO (standard mode)," the CPU 11 writes the input patch data stored in the buffer as it is over the current memory in step S34 since it is not required to convert the read input patch data.

With this process, the input patch data stored in the input patch file, which is specified to be loaded, can be written into the current memory, in a manner appropriate to the mode of the input patch. In this process, the CPU 11 serves as a patch setting device.

Figure 11:
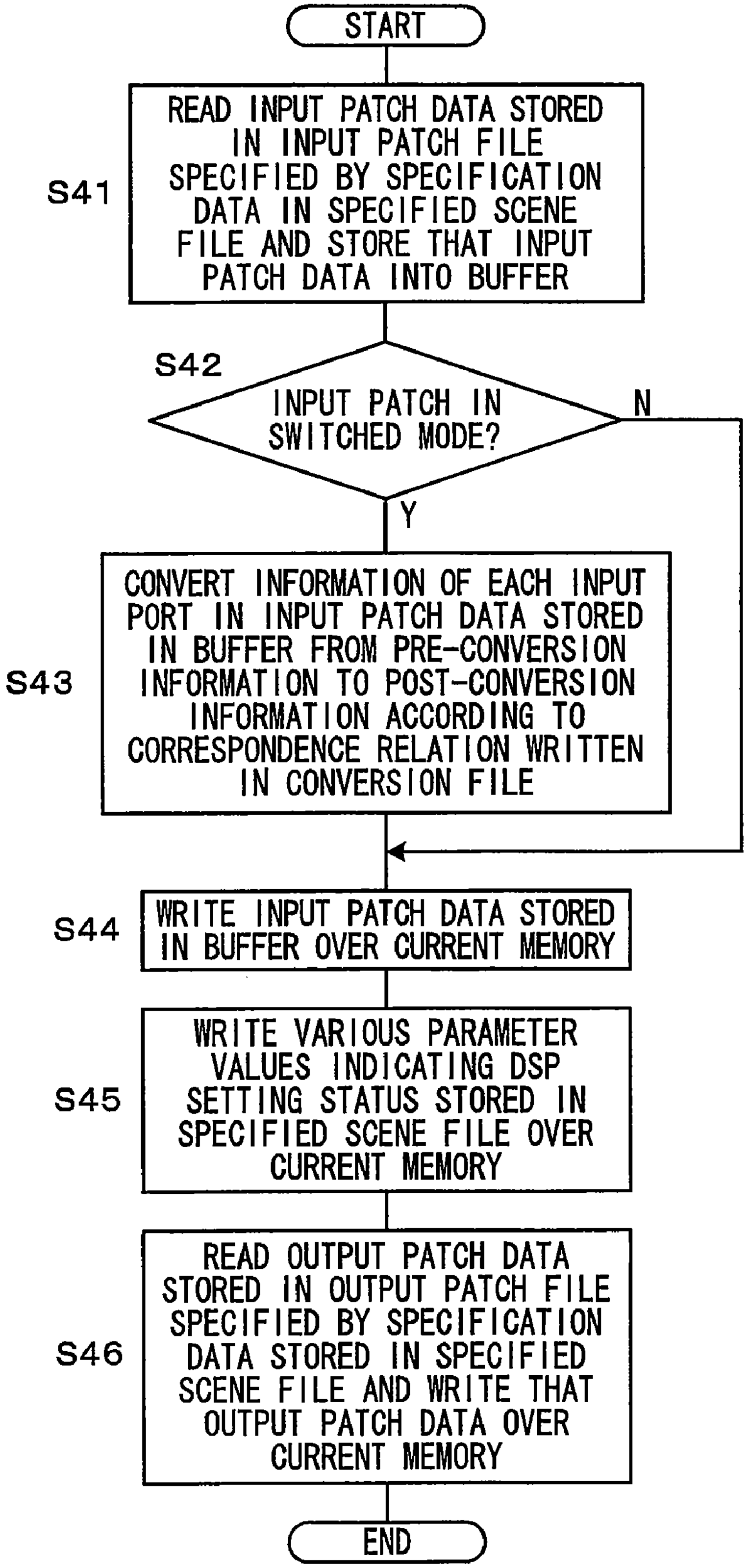
FIG. 11 is a flowchart showing a process executed by the same CPU when an instruction for recalling a scene file is received.

FIG. 11 is a flowchart of a process executed when an instruction for recalling a scene file is received.

To accept an instruction for recalling (loading) a scene file, the CPU 11 leads the user to specify a scene file to be recalled before accepting a recalling instruction. The specification of a scene file to be recalled can be accepted using file numbers or a list of the scene files.

When receiving an instruction for recalling a scene file, the CPU 11 starts the process shown in the flowchart of FIG. 11. The CPU 11 firstly reads the input patch data stored in the input patch file specified by the specification data, which is stored in the specified scene file, and stores the read data in the buffer (S41). Then, similarly to steps S32 to S34 in FIG. 10, the CPU 11 converts information of each input port in the input patch data stored in the buffer to the post-conversion information and stores the input patch data after the conversion over the current memory if the input patch is in the switched mode, or writes the input patch data as it is if the input patch is in the standard mode (S42 to S44).

The CPU 11 writes various parameter values, which are stored in the specified scene file and indicate setting status of the DSP 18, over the current memory as they are (S45). Further, since it is not required to convert output patch files, the CPU 11 reads the data stored in the output patch file specified by the specification data in the scene file, writes the read data over the current memory (S46), and finishes the process.

With this process, a set of parameter values specified by the scene file to be recalled can be written into the current memory in a manner appropriate to the mode of the input patch. In this process, the CPU 11 serves as a scene setting device.

When input patch data is stored in a state it is directly written in a scene file without using specification data, the written input patch data is stored in the buffer in step S41.

Figure 12:
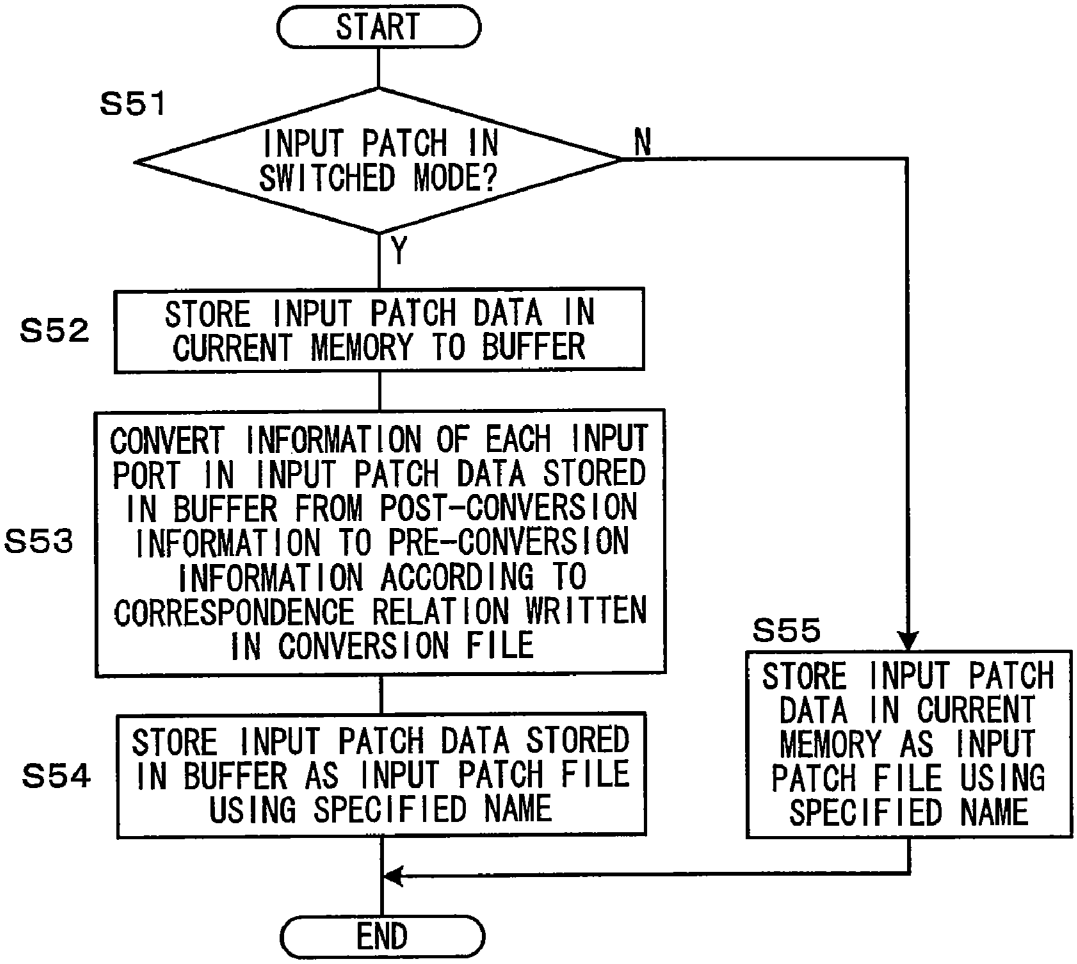
FIG. 12 is a flowchart showing a process executed by the same CPU when an instruction for storing input patch data is received.

FIG. 12 is a flowchart of a process executed when an instruction for storing input patch data is received.

To accept an instruction for storing input patch data, the CPU 11 leads the user to specify a name of an input patch file as which the input patch data is to be stored before accepting the storing instruction.

When receiving an instruction for storing input patch data, the CPU 11 starts the process shown in the flowchart of FIG. 12. Then, if the input patch is in a switched mode (S51), the CPU 11 stores the input patch data in the current memory to the buffer (S52), and converts information of each input port in the stored input patch data from post-conversion information to pre-conversion information according to the correspondence relation written in the conversion file (S53). This conversion process is the same as that performed in step S22 of FIG. 9. Then, the CPU 11 stores the post-conversion input patch data stored in the buffer as an input patch file using a name specified by the user (S54), and finishes the process.

When the result is "No (standard mode)" in step S51, since it is not required to convert the input patch data, the CPU 11 stores the input patch data as it is in the current memory as an input patch file having a specified name (S55), and finishes the process.

Here, the storing processes in steps S54 and S55 can be overwriting when the specified file name is the same as an existing file name.

With this process, the input patch data can be stored in a state of specifying patch content in the standard mode, regardless of the mode of the input patch at the timing of storing. In this process, the CPU 11 serves as a storing device.

Here, there is a problem that the original content of the input patch data in the standard mode becomes unclear when the content of the conversion file is changed after the input patch file is stored, since the content of the input patch data in the switched mode differs according to the content of the conversion file. In view of this problem, it is preferable, in a storing process, to store input patch data as the content of the standard mode, which reflects the user's purpose.

Figure 13:
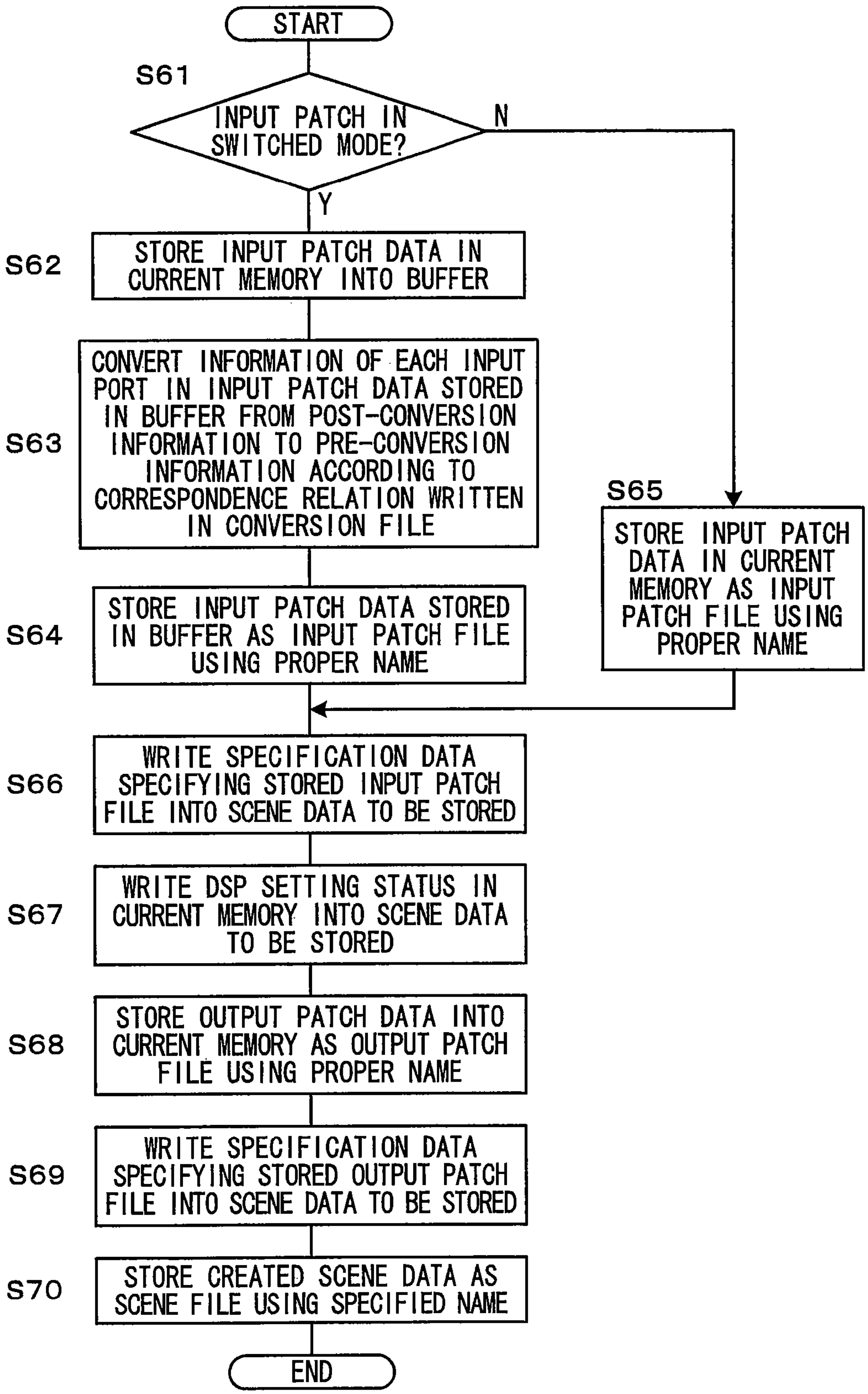
FIG. 13 is a flowchart showing a process executed by the same CPU when an instruction for storing a scene file is received.

FIG. 13 is a flowchart of a process executed when an instruction for storing a scene file is received.

To accept an instruction for storing a scene file, the CPU 11 leads the user to specify a name of a scene file to be stored before accepting the storing instruction.

When receiving an instruction for storing a scene file, the CPU 11 starts the process shown in the flowchart of FIG. 13. In this process, the CPU 11 creates scene data to be stored as a scene file in steps S61 to S69, and stores the created scene data in step S70.

More concretely, similarly to the steps S51 to S55 in FIG. 12, the CPU 11 converts information of each input port in the input patch data stored in the current memory to pre-conversion information and stores the input patch data after the conversion as an input patch file if the input patch is in the switched mode, or stores the input patch data as it is if the input patch is in the standard mode (S61 to S65). Here, the name of the input patch file can be automatically created or specified by the user. Further, the input patch data is required to be stored as a newly created file.

Then the CPU 11 writes specification data specifying the stored input patch file into the scene data to be stored (S66).

Further, the CPU 11 writes the setting status of the DSP 18, which is stored in the current memory, into the scene data to be stored (S67), stores the output patch data in the current memory as an output patch file using a proper file name (S68), and writes specification data specifying the stored output patch file in the scene data to be stored (S69).

Then, the CPU 11 stores the scene data created in the previous steps as a scene file using a specified name (S70), and finishes the process.

With this process, even when the entire content of the current memory is to be stored, the input patch data can be stored in a state of indicating the patch content in the standard mode regardless of the mode when the input patch is stored. In this process, also, the CPU 11 serves as a storing device.

The above is all the description of an embodiment; however, it should be appreciated that the embodiment should not be limited to the above described device configuration, data configuration, concrete process contents, and the like.

For example, in the above embodiment, a case of plural conversion files is not considered; however, plural conversion files can be provided and a desired conversion file can be selected at a desired timing to reflect the selected conversion data in a content of the input patch data in the switched mode.

Figure 14:
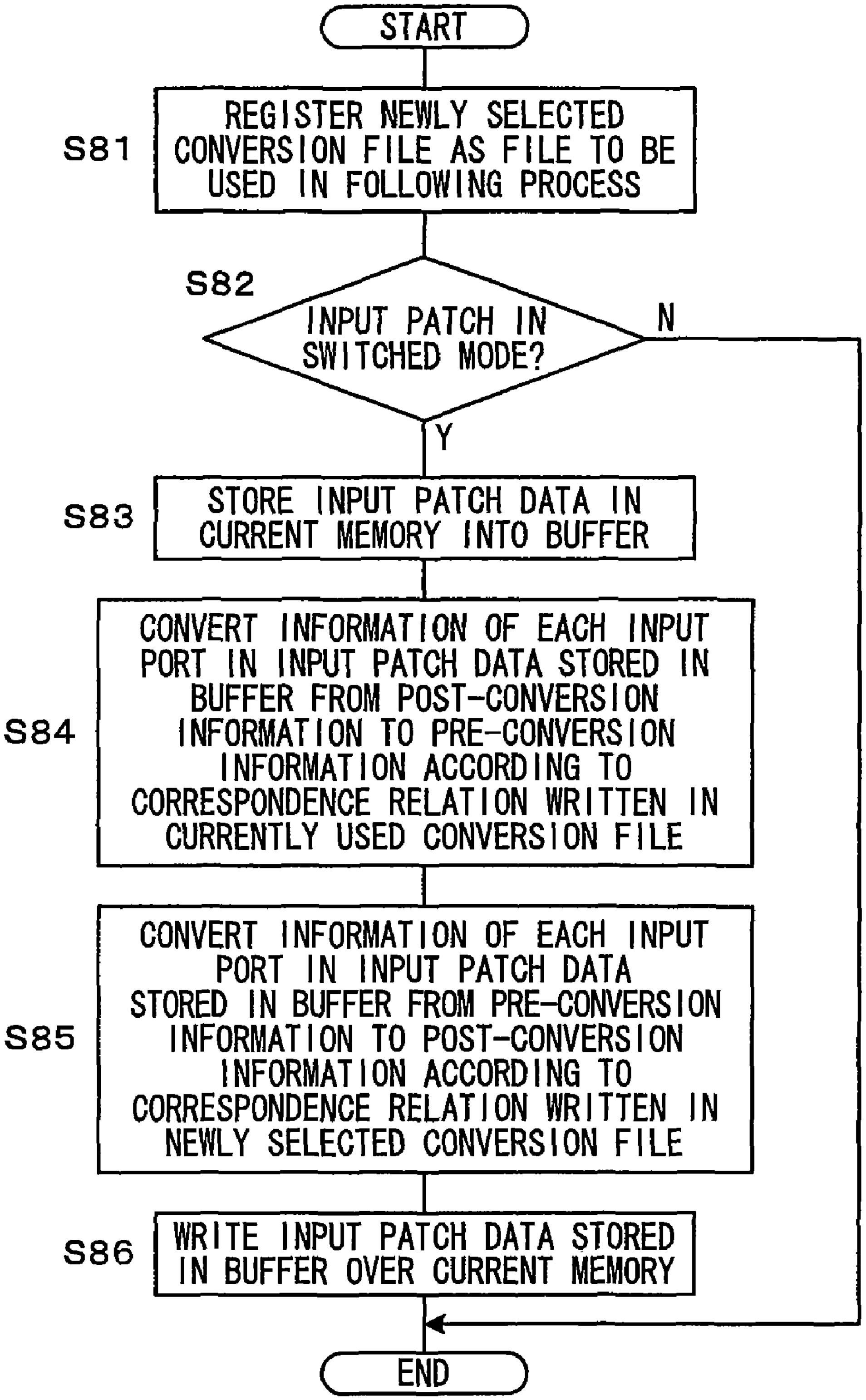
FIG. 14 is a flowchart showing a process executed by the CPU when an instruction for changing a conversion file is received, in a modified embodiment of the invention.

FIG. 14 is a flowchart of a process, in the configuration with plural switching setting files, executed by the CPU 11 when an instruction for changing a conversion file is received.

When receiving an instruction for changing a conversion file, the CPU 11 starts the process shown in the flowchart of FIG. 14. The CPU 11 simply registers the newly selected conversion file as a file to be used in the following processes (S81).

Next, if the input patch is in the switched mode (S82), the CPU 11 stores the input patch data in the current memory to the buffer (S83). Then, the CPU 11 firstly converts information of each input port in the input patch data stored in the buffer from post-conversion information to pre-conversion information according to the correspondence relation written in the currently used conversion file (S84). In other words, the CPU 11 restores the input patch data to the content in the standard mode. Then, the CPU 11 converts information of each input port in the input patch data from the pre-conversion information to post-conversion information according to the correspondence relation written in the newly selected conversion file (S85).

With these conversions, the input patch data in the buffer becomes the content in the switched mode according to the newly selected conversion file. The CPU 11 thus writes the data over the current memory (S86), and finishes the process.

When the result is "NO (standard mode)" in step S82, the CPU 11 finishes the process since it is not required to convert the input patch data in the current memory.

According to the above process, the input patch data can be made in a state corresponding to the newly selected conversion file regardless of the mode, when a selection of the conversion file is changed. In this process, the CPU 11 serves as a patch switching device. Further, in the process in step S81, the CPU 11 serves as a selector.

Figure 15A:
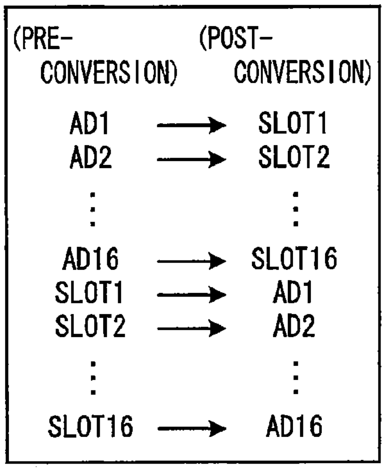
FIGS. 15A and 15B are diagrams showing examples of plural conversion files employed in the modified embodiment.
Figure 15B:
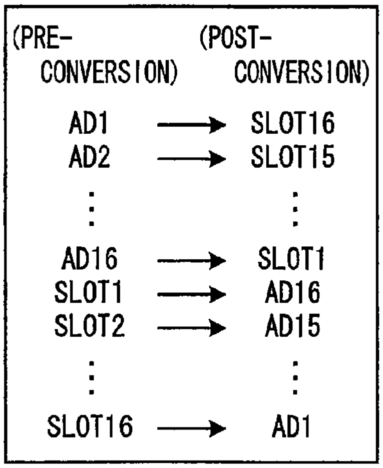
Figure 16:
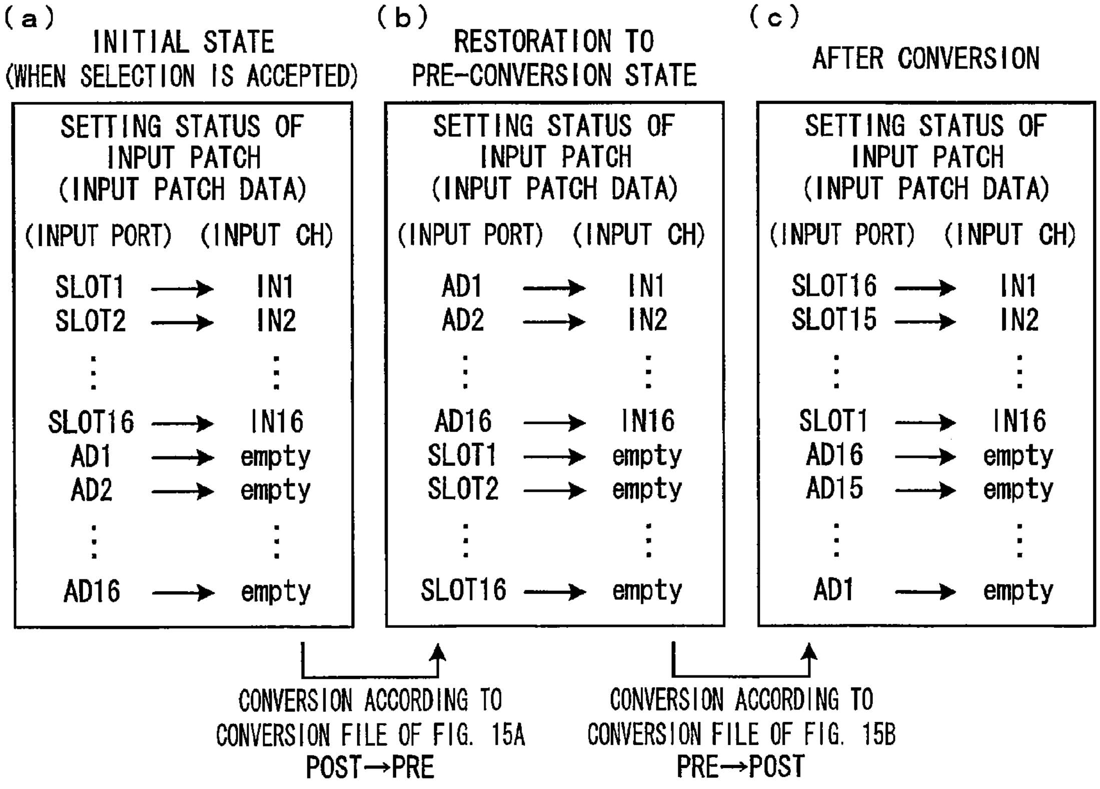
FIG. 16 is a diagram showing an example of conversion of an input patch data when a new conversion file is selected in a switched mode in the modified embodiment.

FIGS. 15A and 15B show examples of plural conversion files, and FIG. 16 shows an example of an input patch data conversion when a new conversion file is selected in a switched mode.

In FIG. 16, (a) shows an initial state of the current memory, in which the input patch data is in a post-conversion state converted according to the correspondence relation written in the currently used conversion file shown in FIG. 15A. FIG. 16 shows the example of the conversion when the conversion file shown in FIG. 15B is selected in such a condition.

In this case, the CPU 11 firstly converts the input patch data to a pre-conversion state shown by (b) according to the correspondence relation written in the conversion file shown in FIG. 15A. Then the CPU 11 changes the input patch data to another post-conversion state as shown by (c) according to the correspondence relation written in the conversion file shown in FIG. 15B.

With this process, obtained is the input patch data in a state similar to the case, in which shifting from the standard mode to the switched mode is instructed while the conversion file shown in FIG. 15B is previously selected.

Figure 17:
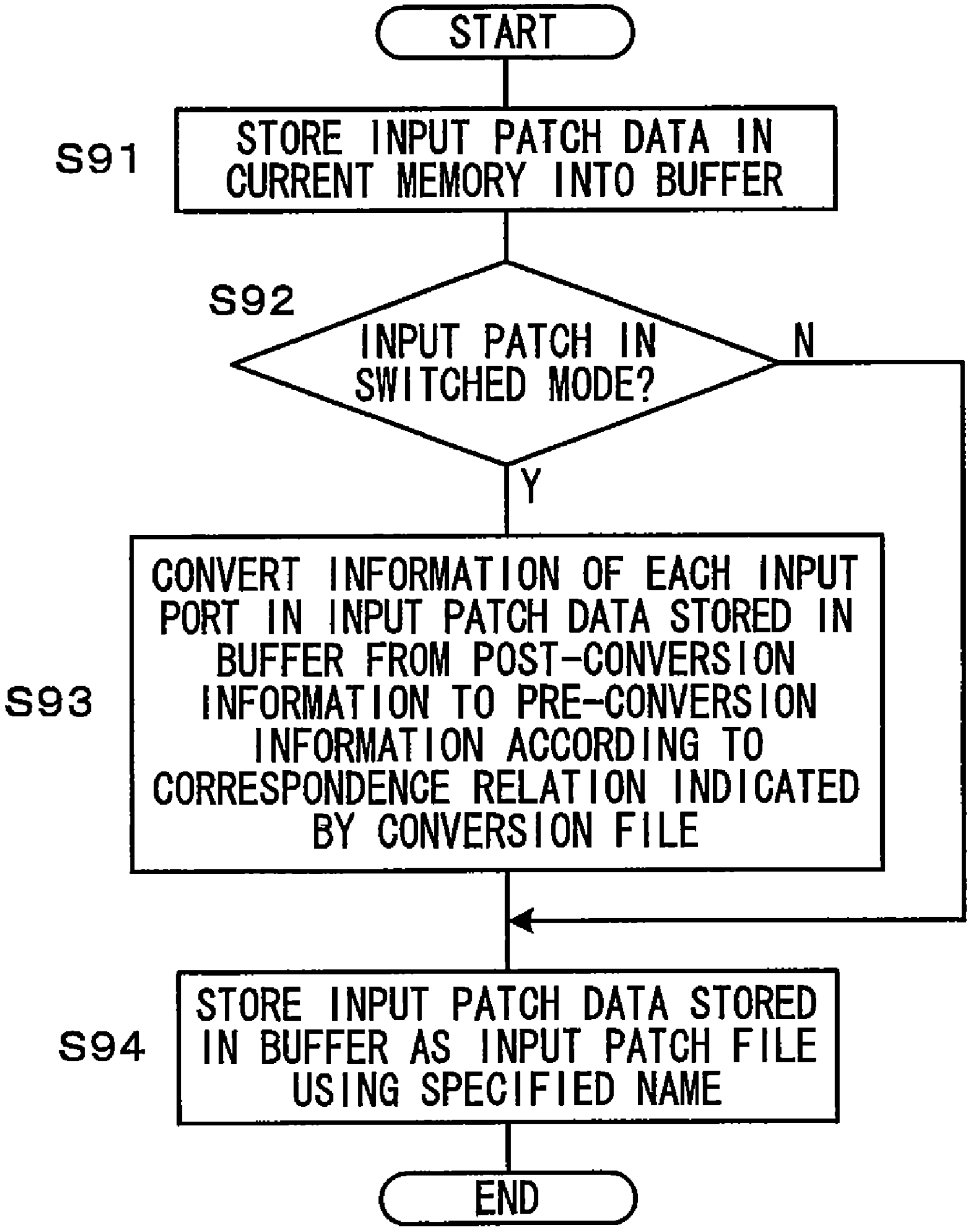
FIG. 17 is a flowchart showing a process executed by the CPU when an instruction for storing input patch data is received, in another modified embodiment.

As another modification, in the input patch data storing process shown in FIG. 12, input patch data in the current memory can be stored in the buffer regardless of the mode of the input patch, similarly to the case of loading shown in FIG. 10. Process in this case is shown in the flowchart in FIG. 17.

In this modification, when the input patch data is stored, the CPU 11 firstly stores the input patch data in the current memory to the buffer (S91). Then, if the input patch is in the switched mode (S92), the CPU 11 converts information of each input port in the input patch data stored in the buffer to the pre-conversion information (S93), and stores the input patch data after conversion as a patch file (S94). If the input patch is in the standard mode, the CPU 11 stores the stored input patch data as a patch file without conversion.

According to this process, the same effect as that in the case of FIG. 12 can be obtained. Further, consistency in processes of the normal and switched modes is improved and load of device development can be reduced.

Further, in contrast, in case of the loading shown in FIG. 10, the CPU 11 can firstly determine the input patch mode and stores the input patch data read from the input patch file directly to the current memory when it is in the standard mode.

As another modification, a conversion file and an input patch file are provided to correspond to each other and, when the input patch file is loaded independently or as a part of a scene, the selection of conversion file can be also changed in response to the loading. According to this configuration, when an input patch file is loaded in a switched mode, information of each input port is changed according to the correspondence relation written in the conversion file corresponding to the loaded input patch file in step S33 in FIG. 10.

As another modification, the input patch data can be stored in the current memory and modified therein without using a buffer, although the input patch data is temporarily stored in the buffer and modified in the buffer according to the above embodiment. With such a configuration, as shown in step S53 in FIG. 12, when a conversion is executed to store, it is required to restore the content of the current memory to the original post-conversion state after the storing.

As another modification, the input patch 33 and output patch 34 can belong to the DSP 18, although they belong to the waveform I/O 17 in FIG. 2.

Further, it is noted that the invention can be applicable to devices having a mixing function, that is, for example, audio signal devices such as a hard disk recorder, an electronic musical instrument, a karaoke machine, a sound generating device and a MIDI sequencer, in addition to a digital mixer itself. Also, it should be appreciated that the present invention is applicable to a case in which a PC executes proper software to function as a mixer.

Further, it is also noted that the present invention is applicable to a system in which a plural audio signal processing devices work together to execute a series of audio signal processings.

A program according to the invention is a program for controlling a computer to control the above described digital mixer. When such a program is executed in a computer, the above descried effects can be obtained.

Such a program can be previously stored in a memory in the computer, such as a ROM or HDD. Or the program can be provided as a stored program in a nonvolatile recording medium (memory) as a recording medium, such as a CD-ROM, a flexible disk, an SRAM, an EEPROM and a memory card. The program recorded in the memory can be installed to the computer so that the CPU can execute, or read by the CPU from the memory to execute, in order to execute above described processes.

Further, the program can be downloaded from an external device, which is connected via a network and has a recording medium which stores the program, or from an external device having a memory which stores the program.

As seen in the above description, according to the audio signal processing device and the computer-readable medium of the invention, in an audio signal processing device which processes audio signals inputted from plural input ports, in plural input channels, it is possible to easily provide settings corresponding to the situations with an accuracy even when audio signals are inputted from different input ports according to the situations and those inputted signals are to be provided for the same signal processing.

Therefore, an audio signal processing device having a high operability can be provided.

What is claimed is:

1. An audio signal processing device which processes audio signals inputted from plural input ports, in plural input channels, comprising:

- a first memory that stores input patch data indicating correspondence relations between each of the input ports and the input channel which processes the audio signal inputted from the input port;
- a second memory that stores conversion data indicating a rule for converting input port information regarding at least one of the input ports included in the input patch data into information of another input port;
- a patch setting device that reads the input patch data from said first memory and sets the data to a state to be reflected in the audio signal processing; and
- a patch switching device that converts the input port information included in the input patch data to be reflected in the audio signal processing into post-conversion information according to the conversion data.

2. An audio signal processing device according to claim 1, further comprising:

- an accepting device that accepts an instruction for shifting the input patch from the switched mode to the standard mode; and
- a second patch switching device that reversely converts the input port information in the input patch data to be reflected in the audio signal processing from the post-conversion information to pre-conversion information according to the conversion data when said accepting device accepts the instruction for shifting.

3. An audio signal processing device according to claim 1, wherein said patch setting device comprises a device that converts the input port information in the read input patch data according to the conversion data to have the post-conversion information being reflected in the audio signal processing if the input patch is in the switched mode when setting the input patch data read from said first memory to the state to be reflected in the audio signal processing.

4. An audio signal processing device according claim 1, further comprising:

- a scene memory that stores scene data comprising a set of parameter values to be reflected in the audio signal processing executed by the audio signal processing device and/or specification data that specifies a source of the parameter values; and
- a scene setting device that sets a proper set of parameter values to a state to be reflected in the audio signal processing according to the scene data read from said scene memory, wherein said scene setting device comprises a device that converts the input port information in the input patch data among the parameter values to be reflected in the audio signal processing according to the conversion data to have the post-conversion information being reflected in the audio signal processing, if the input patch is in the switched mode when setting the set of parameter values to the state to be reflected in the audio signal processing.

5. An audio signal processing device according to claim 1, further comprising:

- a storing device that stores all or a part of the parameter values to be reflected in the audio signal processing, wherein said storing device comprises a device that converts the input port information in the input patch data to be stored, from the post-conversion information into the pre-conversion information according to the conversion data, and stores the pre-conversion information, if the input patch is in the switched mode when the input patch data to be reflected in the audio signal processing is stored.

6. An audio signal processing device according to claim 1, wherein said second memory has a capacity to store plural pieces of the conversion data, a selector that selects conversion data to be used for converting the input patch data is provided, and said patch switching device comprises a device that reversely converts the input port information in the input patch data to be reflected in the audio signal processing from the post-conversion information to the pre-conversion information according to currently used conversion data, and further converts the pre-conversion information to another post-conversion information according to the newly selected conversion data, if the input patch is in the switched mode when said selector selects new conversion data.

7. The audio signal processing device of claim 1, further comprising an accepting device that accepts an instruction for shifting an input patch from a standard mode to a switched mode,

- wherein the patch switching device converts input port information included in the input patch data to be reflected in the audio signal processing into post-conversion information according to the conversion data when said accepting device accepts the instruction for shifting.

8. A non-transitory machine-readable medium containing program instructions executable by a computer that controls an audio signal processing device which processes audio signals inputted from plural input ports, in plural input channels, wherein said program instructions causing said computer to execute:

- a first storing step of storing, to a first memory, input patch data indicating correspondence relations between each of the input ports and the input channel which processes the audio signal inputted from the input port;

a second storing step of storing, to a second memory, conversion data indicating a rule for converting input port information regarding at least one of the input ports included in the input patch data into information of another input port;

a patch setting step of reading the input patch data from said first memory and setting the data to a state to be reflected in the audio signal processing; and a patch switching step of converting the input port information included in the input patch data to be reflected in the audio signal processing into post-conversion information according to the conversion data.

9. The non-transitory machine-readable medium of claim 8, wherein said program instructions causing said computer to further execute:

an accepting step that accepts an instruction for shifting an input patch from a standard mode to a switched mode, wherein the patch switching step converts input port information included in the input patch data to be reflected in the audio signal processing into post-conversion information according to the conversion data when the instruction for shifting is accepted.

* * * * *